United States Patent [19]

Parras

[11] 4,305,429
[45] Dec. 15, 1981

[54] COUPLING FOR TWO CONDUITS

[75] Inventor: Faustino Parras, Chaville, France

[73] Assignee: Framatome, Courbevoie, France

[21] Appl. No.: 94,331

[22] Filed: Nov. 14, 1979

[30] Foreign Application Priority Data

Nov. 22, 1978 [FR] France ................................ 78 32925

[51] Int. Cl.³ ...................... F16L 41/08; F16L 57/00; G21C 13/02
[52] U.S. Cl. ........................................ 138/44; 138/37; 285/189
[58] Field of Search ................. 285/41, 189, 138, 156; 138/44, 37

[56] References Cited

U.S. PATENT DOCUMENTS

| | | | |
|---|---|---|---|
| 1,663,271 | 3/1928 | Kehm | 138/37 |
| 2,031,849 | 2/1936 | O'Leary | 138/44 |
| 2,290,122 | 7/1942 | Wiggins | 138/37 |
| 2,301,296 | 11/1942 | Laurent | 138/44 |
| 2,304,609 | 12/1942 | Stokes | 138/37 |
| 2,388,117 | 10/1945 | Buchanan | 138/44 |
| 2,463,006 | 3/1949 | Vander Clute | 285/189 |
| 3,406,988 | 10/1968 | Jones | 285/156 |

FOREIGN PATENT DOCUMENTS 2229010 12/1974 France ................................ 285/189

Primary Examiner—John W. Shepperd
Attorney, Agent, or Firm—Haseltine & Lake

[57] ABSTRACT

The present invention relates to a coupling, employing a thermal sleeve, for connecting a secondary conduit to a main conduit.

The coupling according to the invention connects a main conduit with a secondary conduit which opens through a lateral opening into the said main conduit and includes a tubular sleeve which is located according to the axis of the secondary conduit, in which the entry mouth of the sleeve is connected in a sealed manner to the said secondary conduit, and its end engages in the said lateral opening thus constituting an orifice, and is so designed that the said sleeve is shaped so that it converges according to the axis of the secondary conduit, in the sense directed from the outside towards the axis of the main conduit.

This coupling may be used in the piping system for a nuclear reactor.

4 Claims, 3 Drawing Figures

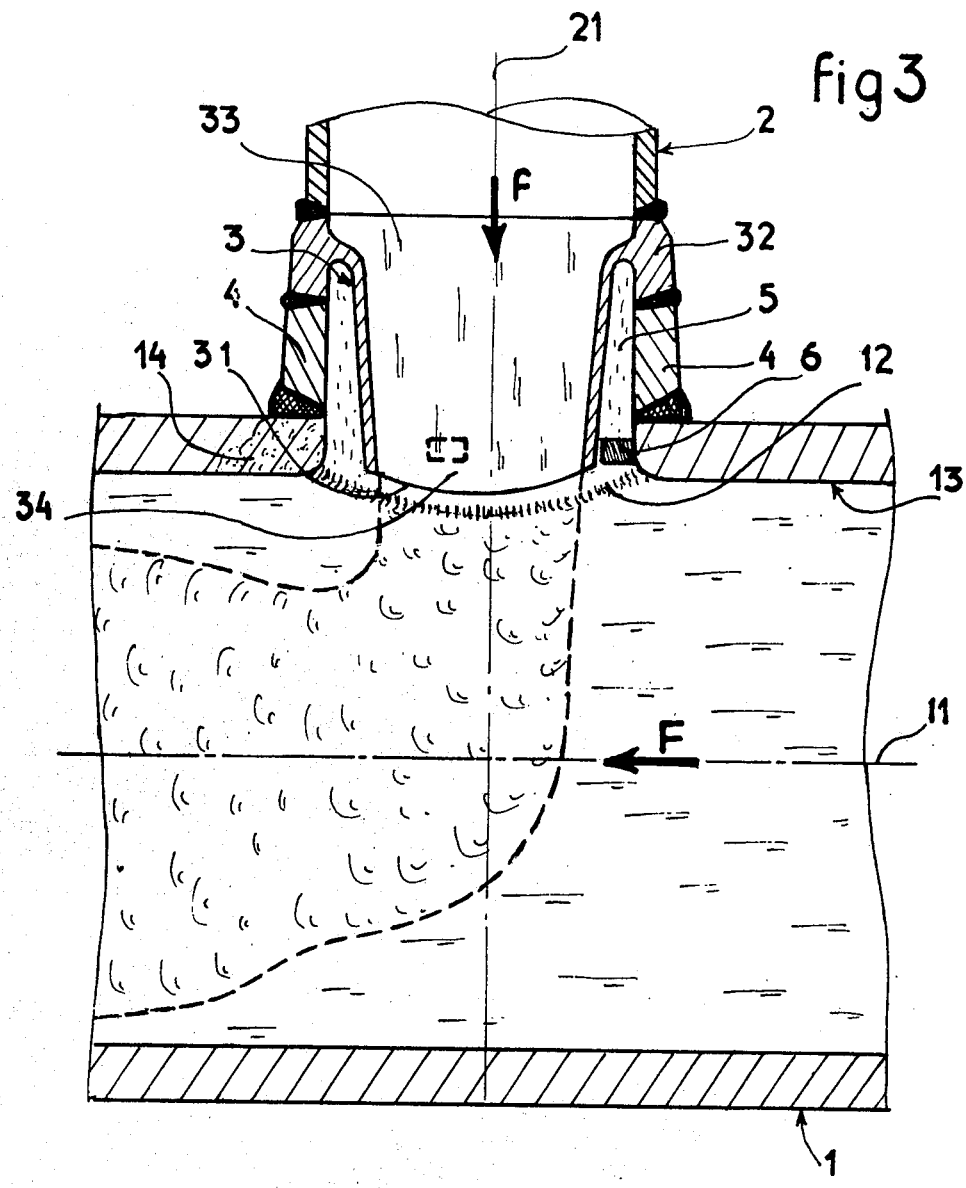

COUPLING FOR TWO CONDUITS

The present invention relates to a coupling, making use of a sleeve known as a thermal sleeve, for connecting a secondary conduit to a main conduit, these being at an angle with respect to each other and providing for passage, respectively, of a fluid which is to be injected into a main fluid, and the main fluid itself. In particular, the fluids under consideration are liquids. For example, the secondary conduit provides for passage of relatively cold water whilst the main conduit has relatively hot water passing through it.

The coupling according to the invention finds particular application in the piping system of nuclear reactors.

A coupling between two conduits is already known which incorporates a tubular sleeve which defines a passage for the liquid to be injected before it enters the main conduit. This sleeve is housed inside a connecting part which is an extension of the secondary conduit. The annular chamber which is formed between the connecting part and the sleeve is open in the area between the end of the sleeve and the lateral opening which provides for communication between the two conduits. This sleeve prevents the liquid which is being injected into the main conduit from reaching the regions where branching of the conduit occurs which are subject to high stresses.

It has been found that relatively hot water which is passing through the main conduit does have a tendency to circulate within the annular chamber surrounding the thermal sleeve. In order to overcome this disadvantage, the outlet orifice of the annular chamber has been reduced in size. In one type of coupling, the sleeve has, at its outer portion, an enlarged annular portion which is located on a level with the orifice providing for communication of the two conduits. Another type of coupling combines the enlarged annular portion of the sleeve with a re-entrant tongue, which is provided in the lateral opening of the main conduit and arranged coaxially with respect to the secondary conduit. A further type of coupling includes plates which are welded to the inside of the connecting part, located in the annular chamber and close to the orifice of this chamber. This arrangement prevents fluttering of the sleeve.

The end of the sleeve may be projecting or retracted with respect to the inner generatrix of the main conduit. The end portion of the sleeve may also be provided with a flared portion which diverges in the sense of flow of the secondary fluid, this flaring either being conical or spherical in shape.

Known designs have proved to not be entirely satisfactory. Even if provisions are made for limiting the circulation of fluid within the annular chamber provided between the sleeve and the connecting part which surrounds it, it is not possible to prevent the formation of vortexes and some upward flow of the fluid injected or the mixture. The stream of fluid to be injected is not moved away adequately from the wall of the main conduit. As a result of this, the main conduit is not protected well. The plane shaping of the end portion of the sleeve accentuates the vortexes and the tendency of the fluid for injection to pass back into the conduit. As the stream of fluid to be injected does not become adequately detached from the wall of the main conduit, the region where the two conduits intersect is poorly protected as are the welds where tacking onto the main conduit has occurred. These defects are accentuated when the ratio of the velocity of the fluid for injection to the velocity of the main fluid comes to a point where it is equal to 1.

The invention provides a coupling, using a sleeve, for the two conduits which does not suffer from the disadvantages referred to above. The sleeve according to the invention slows down the spreading out of the injected stream and of the mixture, which protects the portion of the main conduit located downstream of the welding tacks. It prevents fluid from ascending into the annular chamber surrounding it. A further aim of the invention is to provide good vibrational behaviour of the sleeve.

The coupling according to the invention joins a main conduit and a secondary conduit which opens through a lateral opening into the said main conduit and includes a tubular sleeve which is located according to the axis of the secondary conduit, in which the entry mouth of the sleeve is connected in a sealed manner to the said secondary conduit, and its end engages in the said lateral opening and provides an orifice, and is characterized by the fact that the said sleeve is so shaped that it converges in the direction of the axis of the secondary conduit, in the sense directed from the outside towards the axis of the main conduit and is arranged completely within the said secondary conduit.

According to one characteristic of the invention, the edge of the sleeve is provided with a shaping which matches exactly the surface of an imaginary cylinder which is coaxial with the axis of the main conduit and has a diameter which is approximately equal to the inner diameter of the said main conduit.

The invention will now be described in greater detail with reference to embodiments provided by way of example and which are shown in the attached drawings.

FIG. 3 shows a variation in the embodiment shown in FIG. 1.

Figure 1:
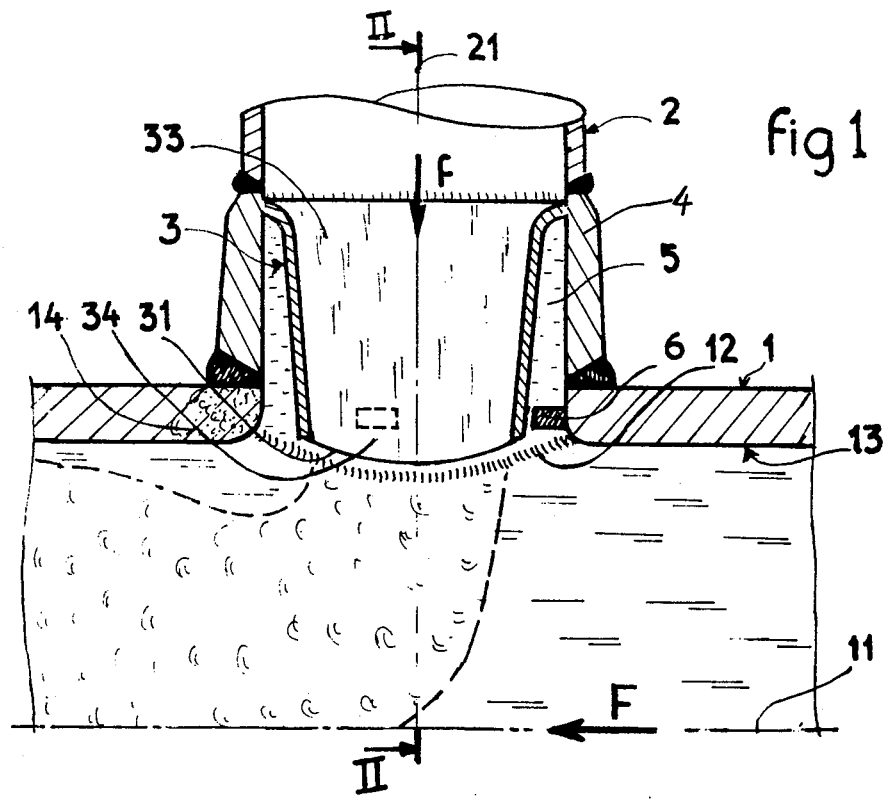
FIG. 1 is a sectional view of a coupling for two conduits fitted with a sleeve according to the invention.
Figure 2:
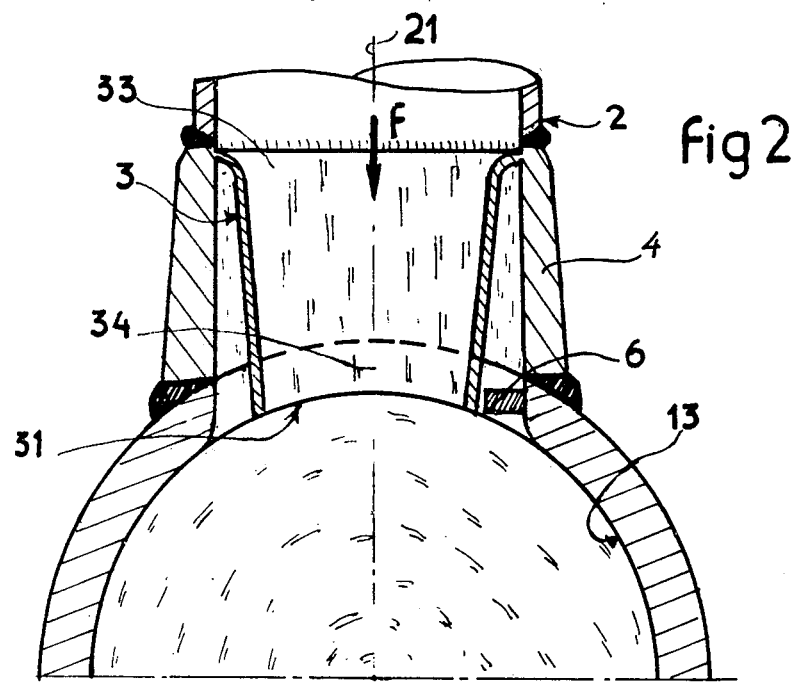
FIG. 2 shows a cross-section according to II—II in FIG. 1.

The coupling shown in FIGS. 1 to 3 provides for connection of a conduit or pipe 1 to a conduit or pipe 2. Conduit 1, known as the main conduit, provides for passage of a stream of a main liquid which is flowing in the sense of arrow F. Conduit 2, known as the secondary conduit, provides for passage of a stream of liquid to be injected which is flowing in the sense of arrow f in the direction of the main conduit. The axis 21 of the secondary conduit and the axis 11 of the main conduit 1 intersect and are at an angle to each other. Generally, the main conduit 1 is at a right angle to the secondary conduit 2. Communication between the two conduits is provided by a lateral opening 12 which is cut out of the cylindrical wall of the main conduit 1. The liquid passing through the main conduit 1 is relatively hot or relatively cold with respect to the liquid flowing in the secondary conduit 2.

The secondary conduit 2 is joined so as to form a branch on the main conduit 1 by making use of a collar 4 which is attached to the conduit 1.

The coupling includes a sleeve 3 having the shape of a tube of revolution. Its axis of symmetry is coaxial with the axis of the secondary conduit 2. The entry mouth 33 of the sleeve is connected in a sealed manner to the secondary conduit. The downstream end 31 through which the secondary liquid passes out is engaged, with a degree of play, in the lateral opening 12 providing communication.

The sleeve is surrounded outwardly by the collar 4 so that an annular chamber 5 is constituted. This chamber is closed at the upstream end by means of the outer flange on the sleeve. It is open at the downstream end, which is also the end nearest the axis 11, at the annular orifice comprised between the opening 12 and the end portion 31 of the sleeve. In the embodiment shown in FIG. 1, the flange on the sleeve is attached all the way round to the collar 4. In the alternative embodiment shown in FIG. 3, the flange forms a one-piece assembly with the outer collar 32 which is attached, at the upstream end, to the conduit 2 and, in the downstream sense, to the collar 4. Sealing is provided between the secondary conduit and the entry into the sleeve. Studs 6 are arranged in the annular orifice comprised between the opening 12 and the sleeve. They are attached to the inner surface of the opening 12.

The shaping of the sleeve is such that it converges according to the axis 21 of the secondary conduit in the sense directed from the outside towards the axis 11 of the main conduit, in other words, in the sense f of the flow of the injected fluid. The cross-section provided for passage of the stream of fluid in the sleeve decreases from the entry 33 up to the exit 34.

The cross-section of the exit 34 of the sleeve is the minimum cross-section for the passage of the liquid injected. The general shape of the sleeve is preferably frusto-conical.

The edge 31 which surrounds the exit 34 from the sleeve has a shaping which surrounds an imaginary cylinder, the axis of which is the axis 11 of the main conduit. The diameter of this imaginary cylinder is approximately equal to the diameter of the internal cylinder 13 of the main conduit, or in other words, the diameter of the liquid stream in this conduit.

The thickness of the sleeve is such that its natural frequency is remote from excitation frequencies of hydraulic origin. With this design, there is no danger of any dynamic coupling phenomena occurring. The studs 6, which are attached so that there is minimum play between them and the sleeve, would keep the latter in place in the case of breakage.

The operation of the coupling according to the invention will now be described.

The injected fluid coming from the secondary conduit 2 is directed by the conical sleeve 3 so that its direction is inclined, generally perpendicularly, to the main conduit 1. The injected fluid is colder or hotter than the main fluid. The stream of injected fluid or of the mixture now takes the form shown in FIGS. 1 and 3. The sleeve 3 slows down the outward expansion of the injected stream and of the mixture in order to protect the region 14 of the main conduit and it also prevents any rising flow into the chamber 5.

Separation of the stream of injected fluid from the upper generatrix of the main conduit 1 also improves the degree of protection of the latter particularly in the case where the ratio of the velocity of the injected fluid to the velocity of the main fluid falls off.

The shaping of the downstream edge 31 of the sleeve plays a part in preventing upward flow of the fluid injected or of the mixture into the chamber 5. The injected fluid is obliged to become mixed right at the point of exit from the sleeve since it does not meet any region where the main fluid is static. Such instantaneous mixing also improves protection of the region 14. One aspect which is not insignificant of the shaping of edge 31 is an improvement in vibrational behaviour since this edge does not at any point oppose the flow of the main fluid.

It is clearly possible, without departing from the scope of the invention, to design variations and detailed improvements and also to consider the use of equivalent means.

I claim:

1. A coupling device for joining a main conduit (1), said main conduit being a fluid collector conduit, and a secondary conduit (2), said secondary conduit being a fluid injector conduit which forms a branch on the said main conduit so as to open through a lateral opening (12) into the said main conduit (1), the axis of said main conduit (1) and the axis of said second conduit intersecting, said second conduit (2) being attached to the main conduit by a collar (4, 32), including a tubular sleeve (3) disposed according to the axis (21) of the said secondary conduit (2), said sleeve having an entry mouth (33) in which said entry mouth (33) is connected in a sealed manner to the said secondary conduit (2) and having its end (34) engaged in the said lateral opening (12), providing an orifice, wherein: said sleeve (3) is shaped to converge in the direction of the axis (21) of the secondary conduit, in a sense directed from the outside towards the axis (11) of the main conduit (1), an edge (31) of said end of the sleeve being shaped to match the surface of an imaginary cylinder which is coaxial with the axis of the main conduit whereby said sleeve is arranged completely within the said secondary conduit.

2. A coupling device according to claim 1, wherein: said imaginary cylinder has a diameter approximately equal to the inside diameter of the said main conduit.

3. A coupling device according to either claims 1 or 2, comprising: studs (6) arranged in said annular orifice comprised between the opening (12) and the sleeve (3).

4. A coupling device according to either claims 1 or 2, wherein: the entry mouth (33) of said sleeve (3) is connected in a sealed manner to said collar (4, 32) which connects the said main conduit (1) and said second conduit (2).

* * * * *